S. H. Frederick.
Clevis.
Nº 92,953.    Patented Jul. 27, 1869.
 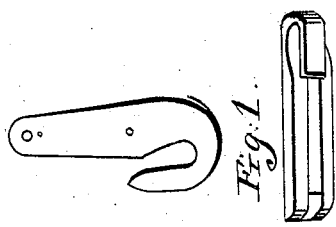 
Fig. 3.    Fig. 2.    Fig. 1.
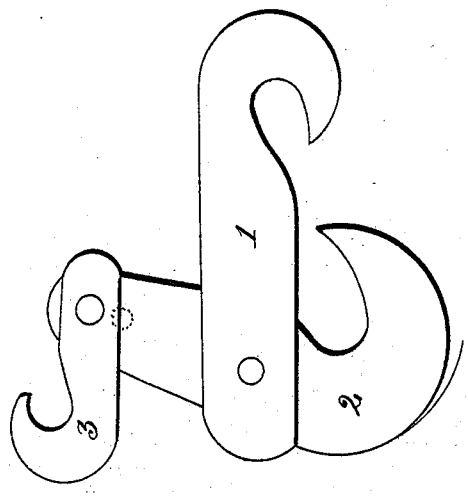
Witnesses:
E. B. Sarton
W<sup>m</sup> Andrews Jr
Inventor:
Samuel H. Frederick

UNITED STATES PATENT OFFICE.

SAMUEL H. FREDERICK, OF MATTESON, MICHIGAN.

IMPROVEMENT IN THREE-HORSE CLEVISES.

Specification forming part of Letters Patent No. 92,953, dated July 27, 1869.

*To all whom it may concern:*

Be it known that I, SAMUEL H. FREDERICK, of Matteson, in the county of Branch and State of Michigan, have invented a new Three-Horse Clevis; and I do hereby declare that the following is a full and exact description thereof, reference being had to the accompanying drawings, and to the figures of reference marked thereon.

The nature of my invention consists of a three-horse clevis.

To enable others skilled in the art to make and use my invention, I will proceed to describe its construction and operation.

I construct of wrought or malleable iron a clevis-hook, No. 1, eight inches in length, the hook situated on the under side and on the back end, and is attached to the plow, reaper, or other draft. The width of said clevis-hook forward of the curved or hooked part is made large enough to admit of a slot five inches in length and one inch in width. The slot is on the front end of the clevis-hook, and is made perpendicular, the hook part down or underneath. Then hook No. 2 is attached to front end of clevis-hook No. 1 in said slot, and is in an upright position, and is held in the slot by means of an iron pin or bolt, which passes through clevis-hook No. 1 near the front end. The hook No. 2 is situated, the back part down, and hook on the back side, and is attached to clevis-hook No. 1 by means of a pin or bolt of iron, four inches from the bottom of said hook No. 2, which allows No. 2 to play on pivot. Then clevis-hook No. 3 is attached to hook No. 2 on the top end by means of iron pin or bolt, which allows it to act as on a pivot, and may be raised or lowered on said hook No. 2 to suit the power of the animal or animals which draw or are drawing on or attached to said hook No. 3.

Clevis-hook No. 3 is five inches in length, with slot two and one-half inches long on back end, to allow the insertion of top end of hook No. 2. Said slot is made same width of the thickness of hook No. 2, and is fastened to its place by iron pin or bolt, and can be raised or lowered at the discretion of the user, the slot to be perpendicular; and bent or hook part of clevis-hook No. 3 is situated on the top side when in use.

What I claim as my invention, and for which I desire to secure Letters Patent, is—

The hook marked 1, slotted at the front end to receive the hook 2, and hook 3, slotted at the rear end to receive the upper end of hook 2, in combination with hook 2, all constructed and arranged as described and shown.

SAMUEL H. FREDERICK.

Witnesses:
GEO. A. COR,
JOSIAH FREDERICK.